No. 856,033. PATENTED JUNE 4, 1907.
J. L. CRISLER.
HARROW ATTACHMENT FOR PLOWS.
APPLICATION FILED APR. 23, 1906.
3 SHEETS—SHEET 2.
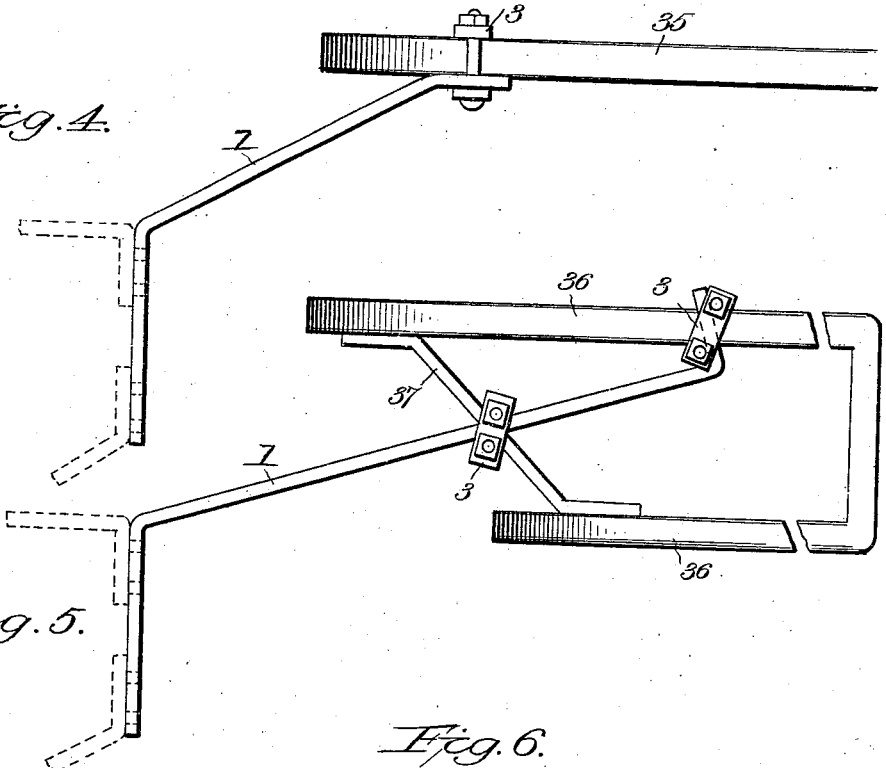
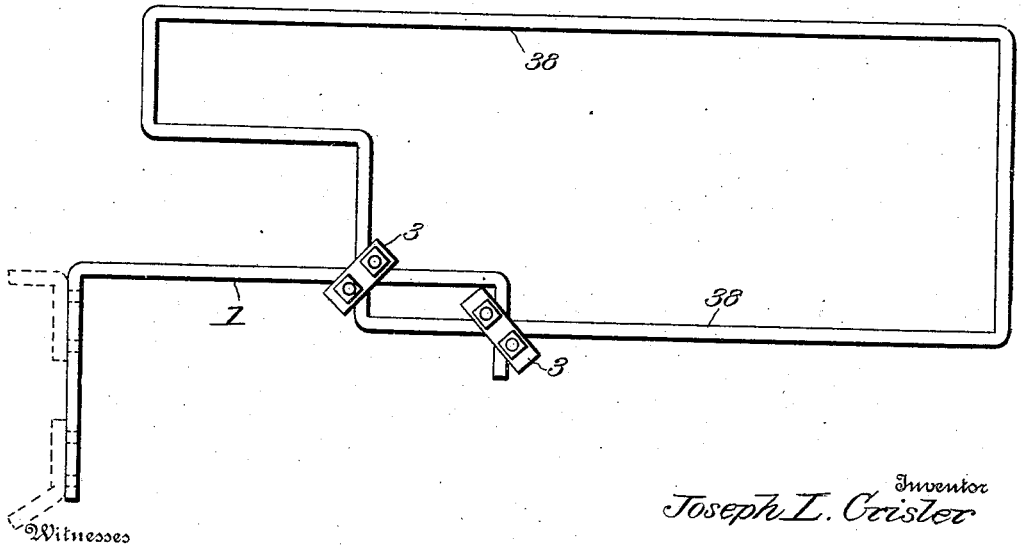

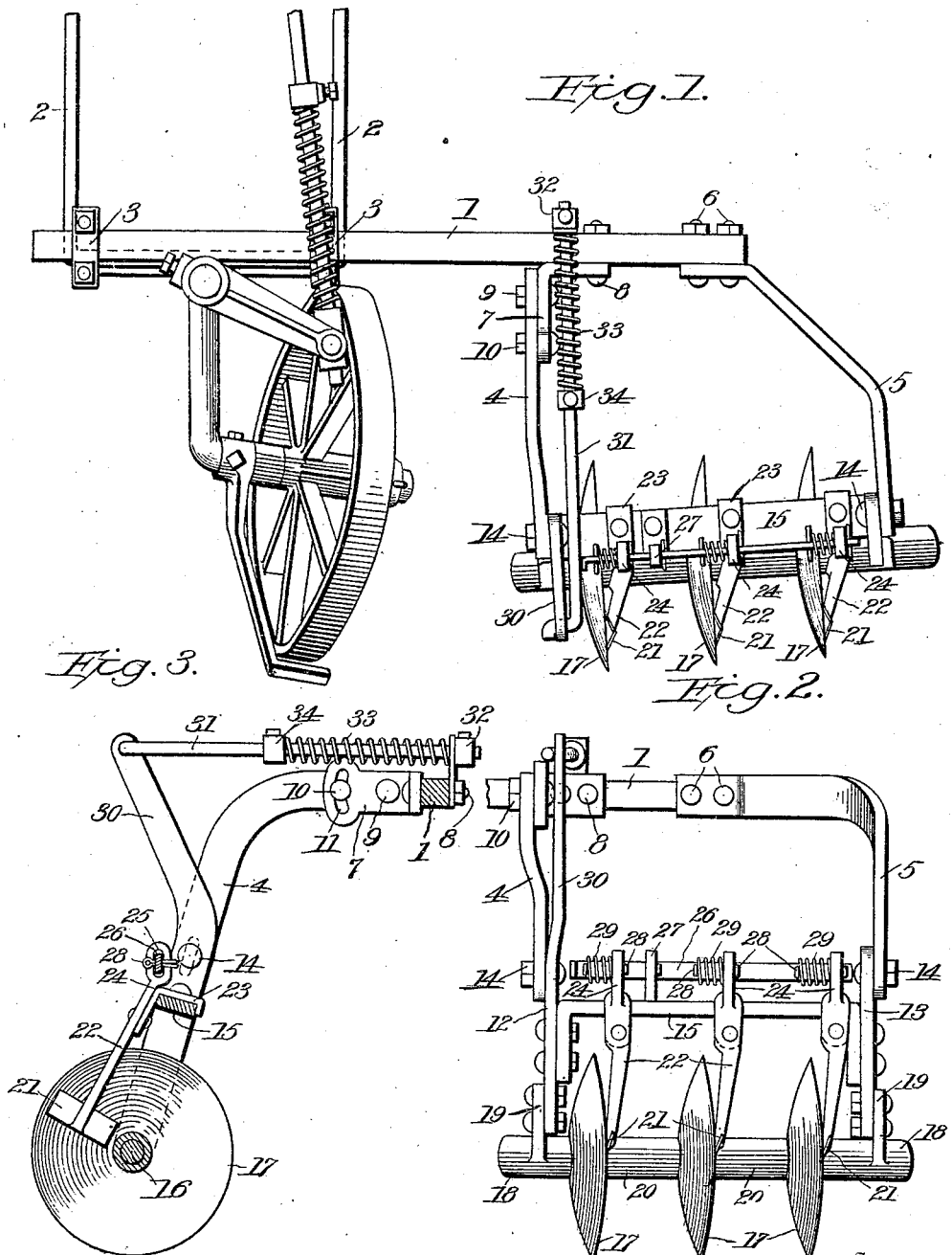

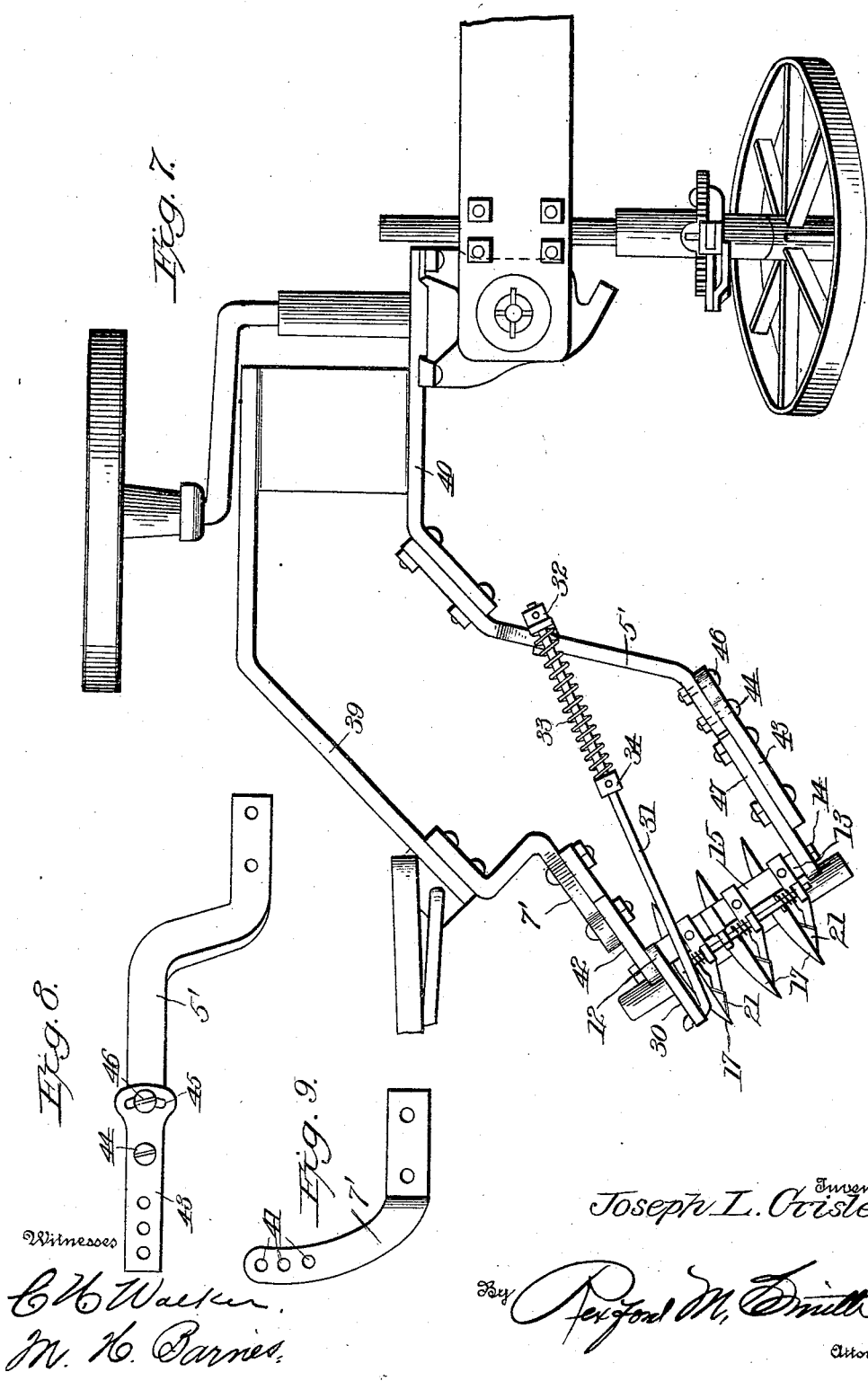

UNITED STATES PATENT OFFICE.

JOSEPH L. CRISLER, OF PERTH, KANSAS.

HARROW ATTACHMENT FOR PLOWS.

No. 856,033.   Specification of Letters Patent.   Patented June 4, 1907.

Application filed April 23, 1906. Serial No. 313,307.

*To all whom it may concern:*

Be it known that I, JOSEPH L. CRISLER, a citizen of the United States, residing at Perth, in the county of Sumner and State of Kansas, have invented a certain new and useful Harrow Attachment for Plows, of which the following is a specification, reference being had therein to the accompanying drawing.

This invention relates to harrow attachments for plows, the object of the invention being to provide a complete, practical and efficient harrow embodying a tilting-frame carrying harrow elements, combined with scraping means for keeping the harrow elements clean and free of adhering soil, the harrow, as a whole, being carried by a supporting frame having means whereby it may be fastened to the frame or beam of a single or gang plow and easily adjusted so as to dispose the harrow elements in proper relation to the plow frame and ground to effectively perform the work for which it is designed.

With the above and other objects in view, the nature of which will more fully appear as the description proceeds, the invention consists in the novel construction, combination and arrangement of parts as hereinafter fully described, illustrated and claimed.

In the accompanying drawings, Figure 1 is a plan view of the harrow attachment, showing also a portion of a wheeled plow upon which the attachment is mounted. Fig. 2 is a rear elevation of the harrow attachment. Fig. 3 is a vertical sectional view of the same. Fig. 4 is a plan view showing the form of supporting-bar used in connection with a sulky riding plow. Fig. 5 is a plan view of the supporting-bar used in connection with a frameless gang plow. Fig. 6 is a plan view showing the form of supporting-bar used in connection with a gang plow frame. Fig. 7 is a plan view of a disk plow showing the harrow attachment mounted thereon. Figs. 8 and 9 are detail views showing the connection between the plow frame and the harrow attachment.

The harrow attachment shown in Figs. 1, 2 and 3 embodies essentially a harrow supporting bar 1 of any suitable length and preferably flat sided so as to rest squarely upon or against either the beam or frame of a plow. As shown in Fig. 1, the supporting-bar 1 extends across the top of the opposite side bars 2 of the frame of a wheeled plow and is firmly fastened thereto by means of clamps 3, which embrace the supporting bar 1 and the bars of the plow frame. By loosening said clamps, the supporting-bar 1 may either be moved lengthwise or laterally upon the plow frame or adjusted angularly until the harrow elements are brought into the desired position, when the supporting-bar may be fastened securely and rigidly to the plow frame by tightening the clamps 3.

The harrow supporting frame consists of the side bars 4 and 5, the outer one 5 of which has its forward end bent into parallel relation to the supporting bar 1 and fastened securely thereto by a pair of clamping bolts 6 or their equivalent. The body of the bar 5 extends outward obliquely beyond the extremity of the supporting bar while the rear end portion thereof is bent to extend backward a suitable distance to receive the tilting hanger frame hereinafter described. The inner side bar 4 of the harrow frame extends almost straight back and has its forward end secured adjustably to a bracket 7 which is L-shaped and fastened firmly to the supporting bar 1 by a pair of clamping bolts 8 or their equivalent. Two bolts 9 and 10 connect the bar 4 to the bracket 7, the forward bolt 9 acting as a pivot for the bar 4, and the other bolt 10 being received in a curved slot 11 in the rearwardly projecting end of the bracket 7, so that by loosening the bolt 10, the side bar 4 may be set upward or downward to a limited extent to impart the requisite lateral dip or pitch to the hanger frame and harrow elements to be described.

The tilting hanger frame which carries the harrow elements embodies the side bars 12 and 13 pivotally connected at 14 to the side bars 4 and 5. The bars 12 and 13 are rigidly connected by a cross bar 15 and the lower ends of the said bars support a shaft 16 on which is mounted a plurality of harrow elements 17, shown in the form of disks. The ends of the shaft 16 are mounted in bearing sleeves 18, having arms or lugs 19 which are secured to the ends of the side bars 12 and 13. The harrow elements are held at the proper distance from each other by the spacing sleeves or washers 20

In connection with each disk 17, a scraper 21 is employed which operates against the dished side of the disk as shown in Fig. 3, said scraper being carried by an arm 22 which is pivotally mounted on a small bracket 23 fastened to the cross bar 15 as best shown in Fig. 3. Each arm 22 is provided with a lever arm or extension 24 provided with a slot 25 through which passes a guide 26, the latter passing through the slots of all the lever arms 24 and also through the stationary post or bracket 27 on the cross bar 15.

At opposite sides of each lever arm 24 are stops 28 shown in the form of cotter pins inserted through holes in the guide 26, while between one of said stops and the lever arm is placed a spring 29 which holds the lever arm toward the other stop and the scraper of that arm in contact with the disk. At the same time the spring allows the scraper to move away from the disk and permits the scraper to adjust itself relatively to the disk. The guide 26 is common to all of the scraper arms and carries all of the scraper sustaining springs and stops which control the positions of the scrapers relatively to the disks.

One of the side arms or bars 12 of the tilting hanger frame is extended to form a lever arm 30 and to the upper extremity of said arm is connected a rod 31, which is adapted to slide through the guide 32 on the supporting bar 1. A thrust spring 33 encircles said rod and is confined between the guide 32 and a collar 34 on the rod, said collar being made adjustable on the rod by means of a set screw, whereby any desired tension may be given to the spring to resist the tilting movement of the hanger. By the construction described the hanger is permitted to tilt automatically to pass obstructions and is returned to its operative position.

The supporting bar 1 shown in Fig. 1 is straight. To attach the harrow to a plow beam, said supporting bar is made in the form of a beam extension arm or bar which is bent or deflected as shown in Fig. 4 so that one end thereof may be fastened by one of the clamps 3 to the side of the plow beam shown at 35, the body of the bar extending obliquely backward from the beam and having the rear end portion projected laterally, substantially at a right angle to the beam.

Where used in connection with a frameless gang plow, the supporting bar or beam extension is bent as shown in Fig. 5, the forward end being extended across one of the plow beams 36 and fastened thereto by one of the clamps 3, while the body of the bar extends obliquely backward therefrom and is fastened by one of the clamps 3 to a brace 37 which connects the beams, the rear end portion of the supporting bar being projected laterally to receive the harrow frame.

When used upon a gang plow frame, the supporting bar or beam extension 1 has its forward portion extended at an angle across one of the side bars of the plow frame, as shown in Fig. 6, while the body portion of the bar extends straight back across the rear connecting part of the frame to which it is fastened by one of the clamps 3, the forward end of said bar being also fastened by a clamp 3 to one of the side bars 38 of the plow frame. The rear end portion of the supporting bar or beam extension is projected substantially at a right angle to the plow frame to receive the harrow frame. Thus by the use of supporting bars or beam extensions of different shapes the harrow attachment is made applicable to any of the well known types of plows and cultivators now in common use without sacrificing any of the self-adjusting and self-cleaning or scraping qualities of the same.

In Fig. 7 the harrow attachment is shown applied to and mounted upon a disk plow of the type now in common use, 39 and 40 designating the beams which carry the disks (not shown). The bracket 7' corresponds with the bracket 7 heretofore described, differing therefrom only in that the rear end portion thereof is upturned as shown in Fig. 9 and provided with a plurality of holes 41 by means of which the bar 42 which forms a pivotal support for the harrow attachment is adjustably connected thereto, being capable of being adjusted up and down to impart any desired lateral inclination or pitch to the gang of harrow elements. Connected to the other plow beam 40 is a rearwardly extending arm or bar 5' which corresponds with the bar 5 heretofore described, and connected to the rear end of said bar 5' is a bracket or extension 43 which is pivotally connected thereto at 44 and provided with an arcuate slot 45 through which is inserted a clamping screw or bolt 46 which also passes through the bar 5' thus enabling the rear end of the bracket or extension 43 to be adjusted up and down and fastened.

47 designates a connecting bar which is bolted or otherwise fastened to the bracket or extension 43 and which forms another pivotal support for the tilting hanger which carries the harrow elements. The remainder of the disk plow illustrated in Fig. 7 is of the ordinary well-known construction and therefore does not need any further description herein.

I claim:

1. The combination with a plow frame, of a harrow supporting extension arm or bar having a general oblique disposition relatively to the line of draft and an outer end portion which is disposed at an angle to the line of draft, a clamp for fastening said extension arm to the plow beam, and a tilting harrow mounted on the angular end portion of said extension arm or bar.

2. The combination with a plow frame, of one or more harrow supporting extension arms or bars having a general oblique disposition relatively to the line of draft and each having an outer end portion which is disposed at an angle to the line of draft, one or more clamps for fastening said extension arm or arms to the plow frame, and a tilting harrow mounted on the angular end portion or portions of said extension arm or arms.

In testimony whereof I affix my signature in presence of two witnesses.

JOSEPH L. CRISLER.

Witnesses:
W. H. OVERHOLTZER,
P. A. DRUMM.